(12) United States Patent
Ebner

(10) Patent No.: US 6,771,392 B1
(45) Date of Patent: Aug. 3, 2004

(54) HIGH RESOLUTION IMAGE MAPPING FOR SIMULATING HIGH RESOLUTION PRINTING USING HIGH ADDRESSABILITY WITHOUT AFFECTING HALFTONE RENDERING

(75) Inventor: Fritz F. Ebner, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/405,878

(22) Filed: Sep. 24, 1999

(51) Int. Cl.[7] ................................................ G06K 9/32

(52) U.S. Cl. ...................... 358/3.07; 358/452

(58) Field of Search ............... 358/1.2, 1.9, 3.06–3.08, 358/528, 451; 382/237, 298–300

(56) References Cited

U.S. PATENT DOCUMENTS

| | | | | |
|---|---|---|---|---|
| 5,274,472 A | * | 12/1993 | Williams | 382/299 |
| 5,742,708 A | | 4/1998 | Yeh et al. | 382/299 |
| 5,758,034 A | * | 5/1998 | Loce et al. | 358/1.2 |
| 5,768,432 A | * | 6/1998 | Schweid | 382/237 |
| 6,301,397 B1 | * | 10/2001 | Jankowski et al. | 382/296 |
| 6,363,177 B1 | * | 3/2002 | Loce et al. | 382/254 |
| 6,449,396 B1 | * | 9/2002 | Loce et al. | 382/276 |

FOREIGN PATENT DOCUMENTS

EP            774856 A2 *  5/1997  ............ H04N/1/40

* cited by examiner

Primary Examiner—Thomas D. Lee
Assistant Examiner—Stephen Brinich
(74) Attorney, Agent, or Firm—Fay, Sharpe, Fagan, Minnich & McKee, LLP

(57) ABSTRACT

A method for simulating high resolution printing by converting high resolution bits of a binary image to sub-pixel high addressable bits is presented. A first image is received having a first fast-scan resolution and a first slow-scan resolution. The first image is converted to a second image having a second fast-scan resolution and a second slow-scan resolution. The second fast-scan resolution of the second image is greater than the first fast-scan resolution of the first image. Also, the second slow-scan resolution of the second image is less than the first slow-scan resolution of the first image. In addition, a method of generating a high addressable halftone image from a high resolution binary image for marking on an image output terminal is presented. A high addressable halftone threshold array having a first high addressability value is converted to a balanced halftone threshold array having a first resolution in a fast-scan direction and the same first resolution in a slow-scan direction. An image is screened by applying the balanced halftone threshold array to the image to generate a screened image which is then converted to a high addressable binary image having a first high addressability value by a mapping transformation conversion.

18 Claims, 6 Drawing Sheets

HIGH RESOLUTION IMAGE MAPPING FOR SIMULATING HIGH RESOLUTION PRINTING USING HIGH ADDRESSABILITY WITHOUT AFFECTING HALFTONE RENDERING

FIELD OF THE INVENTION

The present invention is directed to resolution conversion of binary images. More specifically, the present invention is directed to mapping of binary images to high addressability binary images for simulating high resolution printing, the mapping being reversible in the form of an inverse mapping transformation so that halftone rendering is not adversely affected.

BACKGROUND OF THE INVENTION

Image information, be it color or black and white, is commonly generated in a bitmap format at a particular resolution K×L×b, corresponding to a desired printer output, where K is a number of spots per unit of length in one dimension, L is a number of spots per unit length in the other dimension, and b is the depth of each pixel, in number of levels. This bitmap is present for every color separation of the output device; i.e., four bitmaps for a four-color output device, three bitmaps for a three-color output device, two bitmaps for a two-color output device and one bitmap for a black and white output device.

Generally, rendering high resolution images on laser printers requires both higher fast-scan addressability and slow-scan addressability. It is relatively easier to render fast-scan addressability by increasing the number of bits delivered to the laser printer in the time required for the beam to travel edge to edge. Increasing slow-scan addressability generally requires that either the polygon mirror in the printer be rotated at twice normal speed, or that the process speed be lowered by half, or, still further, by doubling the number of laser beams in the raster output scanner (ROS). Typically, these options add additional costs to the end device or adversely affect performance. Therefore, increasing slow-scan addressability is generally undesirable.

It has thus been suggested to simply convert the image to a new resolution using scaling methods. However, such a solution can cause undesirable loss of information content in the converted image, especially when the resolution of the image is greater than the printer's resolution.

Another attempt to provide a suitable resolution conversion of binary images known as "perspective projection conversion" is taught in U.S. Pat. No. 5,742,708, assigned to the assignee of this application. The perspective projection conversion technique converts binary images to the printer's resolution while retaining the information content of the original image. It simulates higher resolution by increasing fast-scan addressability and appropriately modulating the fast-scan pixels to produce the appearance of a higher resolution. Perspective projection infers 600×600×8 gray pixels by counting up higher resolution binary output then performing high addressable error diffusion to render high addressable by 600 spi in the slow-scan direction. While this is advantageous, certain error diffusion processes that are typically used in conjunction with perspective projection conversion make the forward conversion process irreversible. Among other undesirable effects, this prevents designers from creating multipass halftone arrays because of certain random artifacts introduced by error diffusion.

Therefore, it is desirable to provide a resolution conversion process which converts binary images to the printer's resolution but which is also completely reversible so that conversion between high resolution and high addressability can be performed several times during processing. More particularly, the conversion between high resolution and high addressability can be performed as many times as is necessary by the processing. As an example, repeated conversion between high resolution and high addressability is required when processing a document using a banded imaging model.

It is further desirable to provide a binary image resolution conversion system which is very simple and can be implemented in software or hardware with very little overhead. Preferably, the system simulates high resolution printing using high addressability without affecting halftone rendering.

SUMMARY OF THE INVENTION

In accordance with one aspect of the present invention, a method and apparatus are provided for simulating high resolution printing by converting high resolution bits of a binary image to sub-pixel high addressable bits by using a forward resolution conversion. A first binary image is received having a first fast-scan resolution and a first slow-scan resolution. The first binary image is converted to a second image having a second fast-scan resolution and a second slow-scan resolution. The second fast-scan resolution is greater than the first fast-scan resolution, and the second slow-scan resolution is less than the first slow-scan resolution. Preferably, the conversion of the first binary image to the second binary image is carried out by performing a series of direct mapping transformations of groups of pixel "tiles" from the first image to groups of pixel "tiles" in the second image, for the entire image so that there is a one-to-one correspondence of bits in small predefined areas of the first image to corresponding small predefined areas of the second image.

In accordance with another aspect of the invention, the mapping transformation is reversible to map a plurality of portions of the second high addressible binary image to a corresponding plurality of portions in the first high resolution binary image without loss of first or second binary image information by using an inverse resolution conversion. Preferably, the conversion of the first binary image to the second high addressability binary image includes a mapping transformation of a plurality of 2×2 pixel block portions of the first image to a corresponding plurality of 4×1 pixel block portions of the second image. The mapping is reversible enabling an inverse transformation of the plurality of 4×1 pixel block portions of the second image to said corresponding plurality of 2×2 pixel block portions of the first image.

In accordance with yet another aspect of the invention, the binary image resolution conversion by reversible direct mapping transformation enables high addressable halftone threshold arrays to be pre-processed, then rendered normally in real time at high resolution, and later forward mapped to convert the rendered image to a high addressable image suitable for marking on an image output terminal.

It is a primary advantage of the present invention that resolution conversion of binary images is enabled in a simple fashion and with a minimal software investment.

Another advantage of the present invention is that binary image resolution conversion is accomplished using a reversible direct mapping technique. This allows halftone designers to create multipass halftone arrays without undesirable artifacts introduced by error diffusion or other techniques commonly associated with prior art resolution conversion systems.

Further objects and advantages of the present invention will become apparent from the following descriptions of the various features of the present invention.

BRIEF DESCRIPTION OF THE DRAWING

The following is a brief description of each drawing used in describing the present invention, thus, the drawings are presented for illustrative purposes only and should not be limitative of the scope of the present invention wherein.

DETAILED DESCRIPTION OF THE PREFERRED EMBODIMENTS

Figure 1:
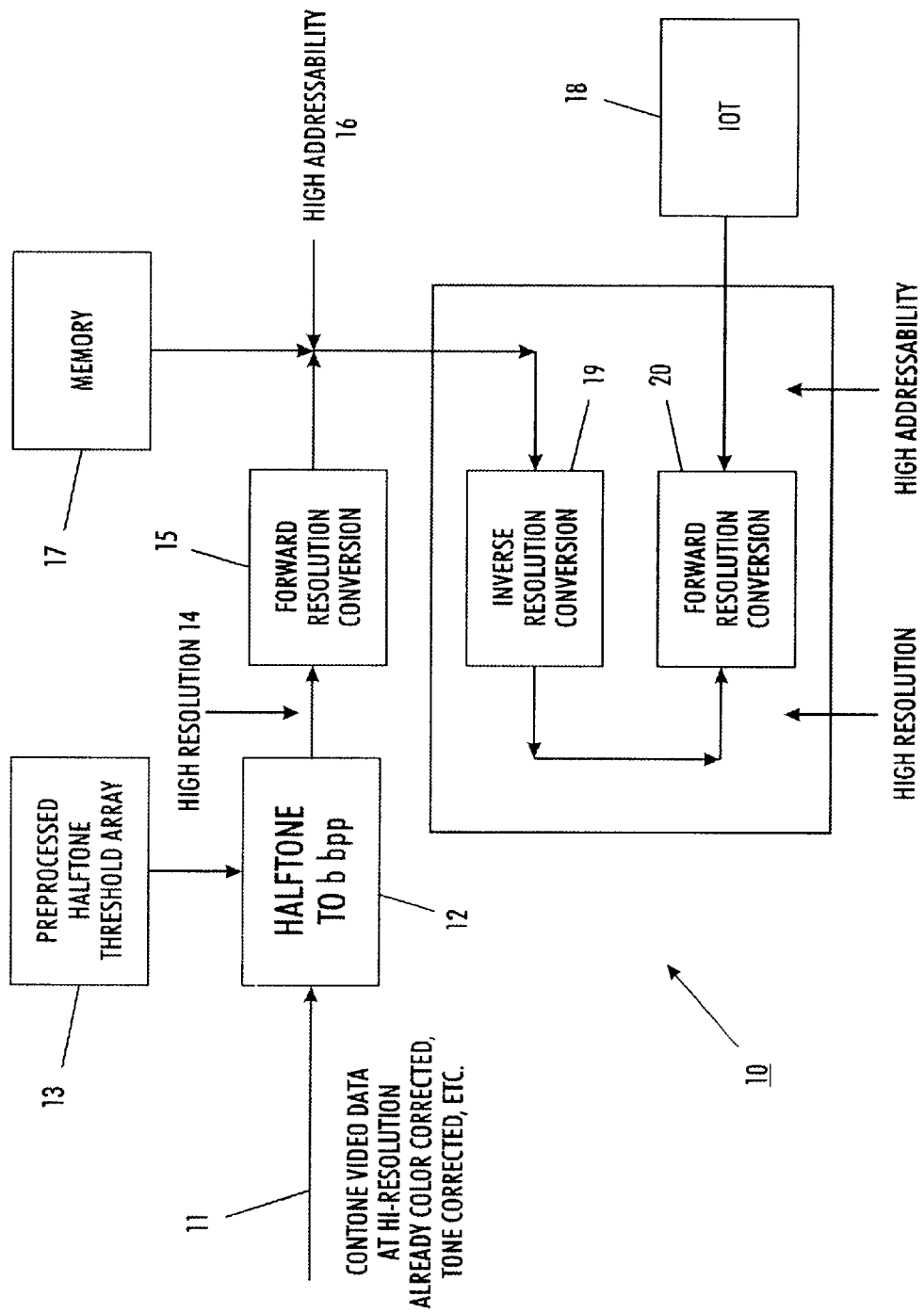
FIG. 1 is a block diagram illustrating a binary image resolution conversion system according to the aspects of the present invention.

The following will be a detailed description of the drawings illustrating the present invention. In the description, as well as in the drawings, like reference numerals represent like devices, circuits, or equivalent circuits performing the same or equivalent functions.

In describing the present invention, the term "pixel" has been utilized. This term may refer to an electrical (or optical, if fiber optics are used) signal which represents the physical measurable optical properties at a physically definable area on a receiving medium. The receiving medium can be any tangible document, photoreceptor, or marking material transfer medium. Moreover, the term "pixel" may refer to an electrical (or optical, if fiber optics are used) signal which represents the physically measurable optical properties at a physically definable area on a display medium. A plurality of the physically definable areas for both situations represents the physically measurable optical properties of the entire physical image to be rendered by either a material marking device, electrical or magnetic marking device, or optical display device.

Lastly, the term "pixel" may refer to an electrical (or optical, if fiber optics are used) signal which represents physical optical property data generated from a single photosensor cell when scanning a physical image so as to convert the physical optical properties of the physical image to an electronic or electrical representation. In other words, in this situation, a pixel is an electrical (or optical) representation of the physical optical properties of a physical image measured at a physically definable area on an optical sensor.

Also, in describing the present invention, the terms "fast-scan resolution", "slow-scan resolution", and "pixel depth resolution" have been utilized. The term "fast-scan resolution" refers to the number of pixels or spots generated per inch (spi) in the fast-scan direction or electrical scan of the image. More specifically, fast-scan resolution refers to the resolution of the number of pixels making up a single scanline of an image. Moreover, the term "slow-scan resolution" refers to the number of pixels or spots per inch (spi) in the slow-scan direction; i.e., slow-scan resolution refers to the number of scanlines generated per inch.

The term "pixel depth resolution" refers to the number of bits per pixel (bpp) utilized to define the grayscale properties of a pixel or subpixel. For example, if a single bit is the pixel depth resolution for a particular pixel, this resolution would characterize the pixel as having two levels or as being either black or white. However, if the pixel depth resolution for a particular pixel is 2 bits, the resolution may allow the pixel to be defined as a matter of four separate gray levels from white to black.

Thus, in defining the present invention, the resolution of the pixel will be stated in numeric values separated by X's wherein the first numeric value corresponds to the fast-scan resolution, the second numeric value corresponds to the slow-scan resolution, and the third numeric value corresponds to the pixel depth resolution.

FIG. 1 illustrates a block diagram of a binary image resolution conversion system 10 using the concepts of the present invention. In this embodiment, video data or image data 11 in the form of pixels is fed into a halftoner circuit 12 where the image data is halftoned using a pre-processed halftone threshold array 13. Preferably, the image data 11 is high resolution contone video data that has been previously color corrected, tone corrected, and the like. In accordance with the invention, the pre-processed halftone threshold array 13 is derived from an inverse resolution conversion of a high addressability threshold array to a high resolution threshold array for halftoning of the image data 11. Alternatively, the halftone threshold array 13 may be formed using other suitable techniques so that the halftoner circuit 12 can halftone the image data to generate high resolution processed image or video data 14.

A forward resolution conversion circuit 15 transforms the high resolution image or video data 14 to high addressability processed image or video data 16. The processed image or video data 16 is then fed into a memory 17 to be stored for later use or directly into a an image output terminal 18 such as a laser printer, thermal ink-jet printer, or other type of marking engine which is capable of converting an electronic representation of an image to a tangible document or display of the image.

As noted above, it is an advantage of the present invention that conversion between high resolution and high addressability can be performed as many times as necessary or required by the image processing. This being the case, an inverse resolution circuit 19 is provided for converting the high addressability image or video data 16 to high resolution data that may be required to perform some data processing or the like. A forward resolution conversion circuit 20 converts the high resolution image or video data to high addressability data suitable for use by the image output terminal 18. The preferred forward and inverse processing executed by the resolution conversion circuits 15, 20 and by the inverse resolution conversion circuit 19 will be described in accordance with the present invention will be described below.

Figure 2:
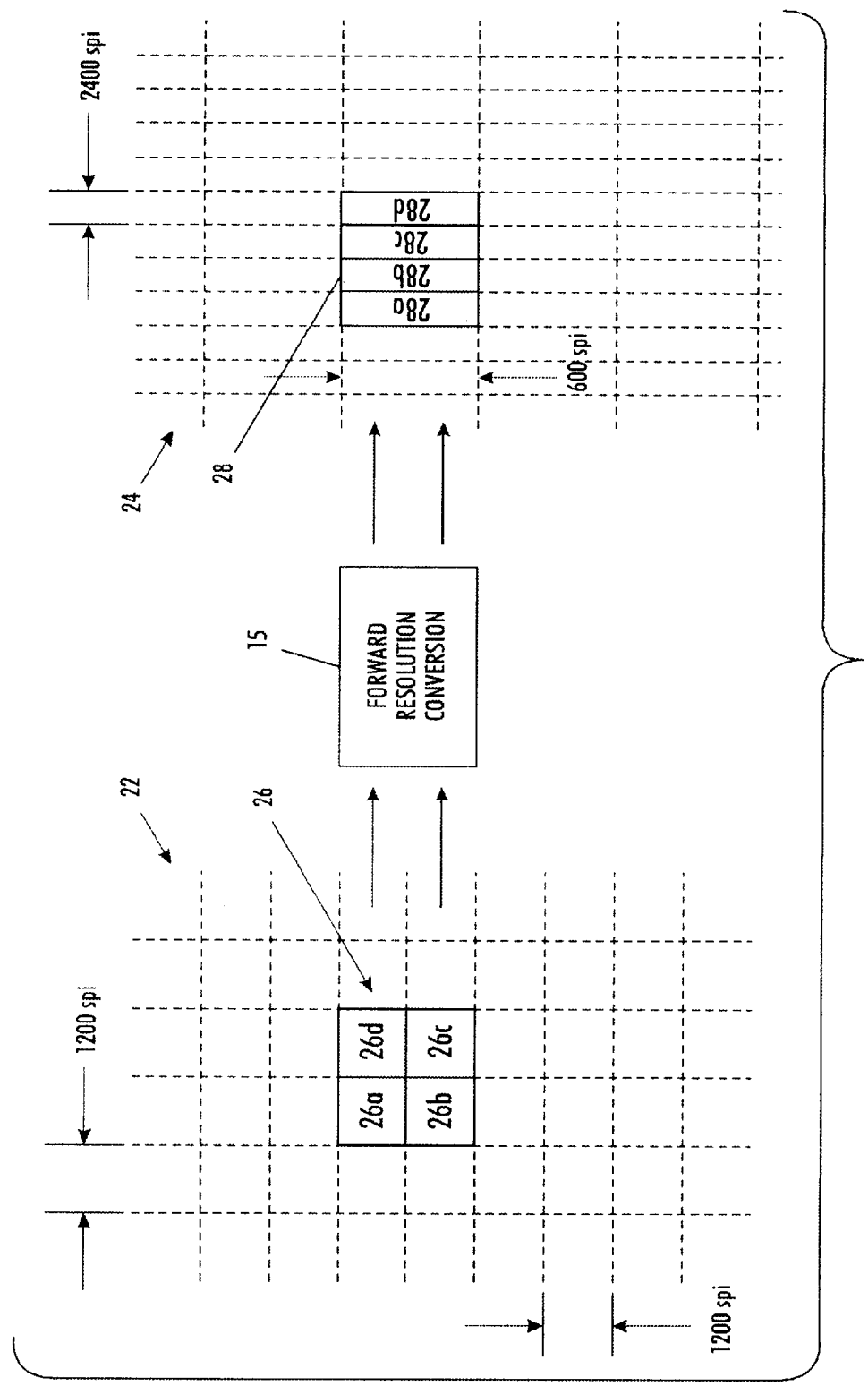
FIG. 2 is a graphical representation of a conversion of a 1200×1200×b image to a 2400×600×b high addressable image according to the concepts of a first embodiment of the present invention.

FIG. 2 is a graphical representation detailing the forward resolution conversion image mapping circuits 15, 20 of FIG. 1. As illustrated in FIG. 2, the image or video data 22 received by the image mapping circuit 15 has a resolution of 1200×1200×b. In other words, the image or video data has a fast-scan resolution of 1200 spi, a slow-scan resolution of 1200 spi, and a pixel depth resolution of b bpp. The image conversion circuit 15 is adapted to render high resolution bitmaps to high addressable bit maps with a specified order. More particularly, high addressable bits 24 are created from high resolution bits 22 according to a predetermined order. In accordance with the first preferred embodiment of the invention, the predetermined order is selectable dependent upon the characteristics of the image output terminal 18. Although any suitable mapping order can be used, FIG. 2 shows the preferred predetermined mapping order used when the image output terminal (IOT) is a Xerox C55 engine. More particularly, as shown, the image mapping circuit 15 maps 2×2 pixel blocks 26 in the 1200×1200 image 22 to a corresponding set of 4×1 pixel blocks 28 in the 2400×600 resolution image 24. Each of the pixels 28a–28d in the 2400×600 pixel block 26 are made up from corresponding pixels 26a–26d in the 1200×1200 pixel block 26.

As illustrated in FIG. 2, a first pixel 26a having a resolution of 1200×1200×b is mapped to a first pixel 28a in a first portion of the 4×1 pixel block 28. Similarly, the second through fourth pixels 26b–26d from the second through fourth portions of the 2×2 pixel block 26 are mapped to second through fourth pixels 28b–28d in second through fourth portions of the 4×1 pixel block 28. It is an advantage of the present invention that the ¹⁄₁₂₀₀ vertical lines are exactly preserved in the mapping. Further, it is to be noted that it is a further advantage of the invention that ¹⁄₁₂₀₀ horizontal lines are converted to half bit lines at ¹⁄₆₀₀ resolution. In accordance with the first preferred embodiment of the invention, ¹⁄₂₄₀₀ half bits are discouraged in the mapping order because isolated pixels at ¹⁄₂₄₀₀ resolution do not resolve well on the Xerox C55 engine shown as an example of a preferred IOT. Lastly, as shown in the figure, each 2×2 pixel block 26 in the input image data 22 is mapped to a corresponding 4×1 pixel block 28 in the high addressable image 24 so that there is a one to one correspondence between image bits in a small 2×2 area of the input image with a small 4×1 area of the high addressable output image. Preferably, the 2×2 to 4×1 mapping is "tiled" or replicated so that each 2×2 pixel block in the input image is transformed or mapped into a corresponding 4×1 high addressable pixel block in the output image data.

Figure 3:
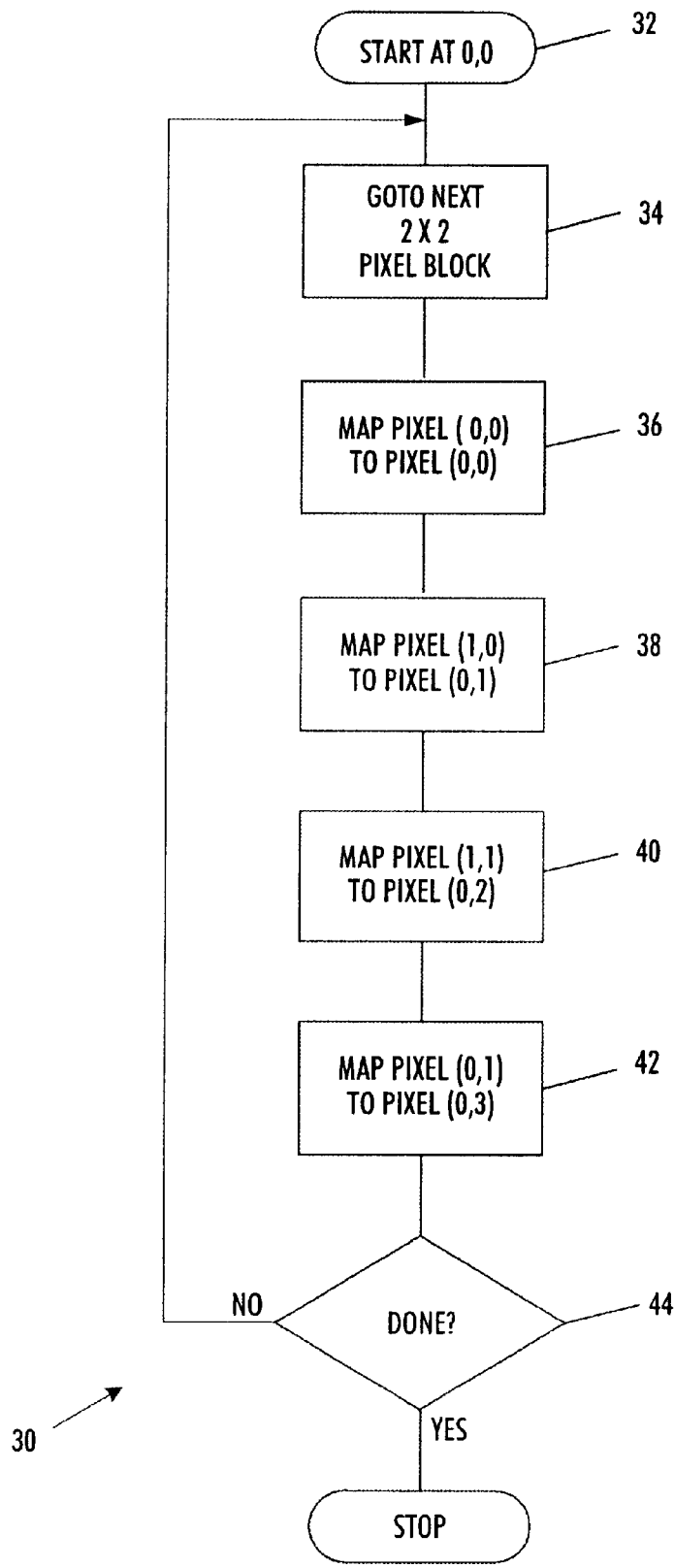
FIG. 3 is a flow chart illustrating the conversion process executed in the graphical representation of FIG. 2.

FIG. 3 illustrates in a simplified flow chart form of the mapping method 30 shown graphically in FIG. 2. Turning now to that figure, the method 30 begins at step 32 at an origin or 0,0 datum "location" in the binary input image data 22. Next, at step 34, a first 2×2 pixel block in the input image data 22 is located. At step 36, pixel 0,0 of the first 2×2 pixel block is mapped directly to pixels 0,0 in the 4×1 pixel block 28. Next, at step 38, the second pixel 26b at location 1,0 in the 2×2 pixel block 26 is mapped to a pixel 28b at location 0,1 in the 4×1 pixel block 28. At step 40, the third pixel 26c at position 1,0 in the 2×2 pixel block 26 is mapped to a third pixel 28c at location 0,2 in the 4×1 pixel block 28. Lastly, at step 42, the fourth pixel 26d of the 2×2 pixel block 26 is mapped to a fourth pixel 28d at location 0,3 in the 4×1 pixel block 28. Next, at step 44, it is determined whether each of the 2×2 pixel blocks in the input image has been converted into a 4×1 high addressability image block. If not, the sequence 34/42 is repeated until each of the 2×2 pixel blocks in the input image is converted into a 4×1 pixel block according to the scheme shown in FIG. 3.

Figure 4:
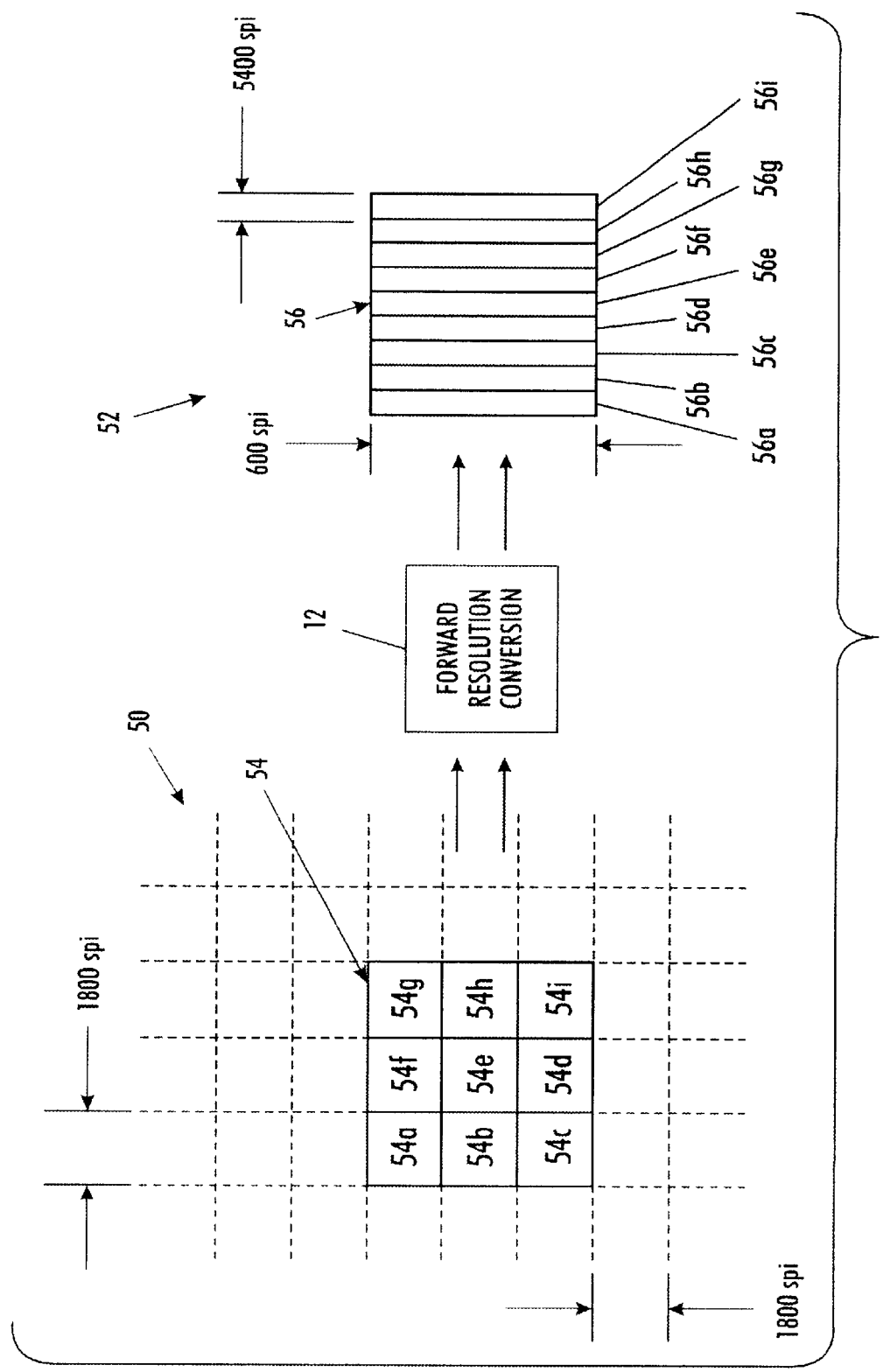
FIG. 4 is a graphical representation of a conversion of a 1800×1800×b image to a 5400×600×b high addressable image according to the concepts of a second embodiment of the present invention.

FIG. 4 is a graphical representation detailing the image mapping circuit 12 of FIG. 1 in accordance with a second preferred embodiment of the invention wherein the image or video data 50 has a resolution of 1800×1800×b. In other words, the image or video data has a fast-scan resolution of 1800 spi, a slow-scan resolution of 1800 spi, and a pixel depth resolution of b bpp. The image conversion circuit 12 is adapted to render high resolution bitmaps to high addressable bitmaps with a specified order. More particularly, high addressable bits 52 are created from high resolution bits 50 according to a predetermined order. As shown, the image mapping circuit 12 maps 3×3 pixel blocks 54 in the 1800×1800 image 50 to a corresponding set of 9×1 pixel blocks 56 in the 5400×600 resolution image 52. Each of the pixels 54a–54i are mapped to a corresponding set of pixels 56a–56i in the 5400×600 pixel block 56.

As illustrated in FIG. 4, a first pixel 54a having a resolution of 1800×1800×b is mapped to a first pixel 56a in a first portion of the 9×1 pixel block 56. Similarly, the second through ninth pixels 54b–54i from the second through fourth portions of the 3×3 pixel block 54 are mapped to second through fourth pixels 56b–56i in second through fourth portions of the 9×1 pixel block 56. As shown in the figure, each 3×3 pixel block 54 in the input image data 50 is mapped to a corresponding 9×1 pixel block 56 in the high addressable image 52 so that there is a one-to-one correspondence between image bits in small 3×3 areas of the input image with small 9×1 areas of the high addressable output image. Preferably, the 3×3 to 9×1 mapping is "tiled" or replicated so that each 3×3 pixel block in the input image is transformed or mapped into a corresponding 9×1 high addressable pixel block in the output image data. It is to be noted that any 1:1 mapping of high resolution blocks to high addressability blocks can be performed. However, the mapping should be uniform or the same for all blocks on a page.

Figure 5:
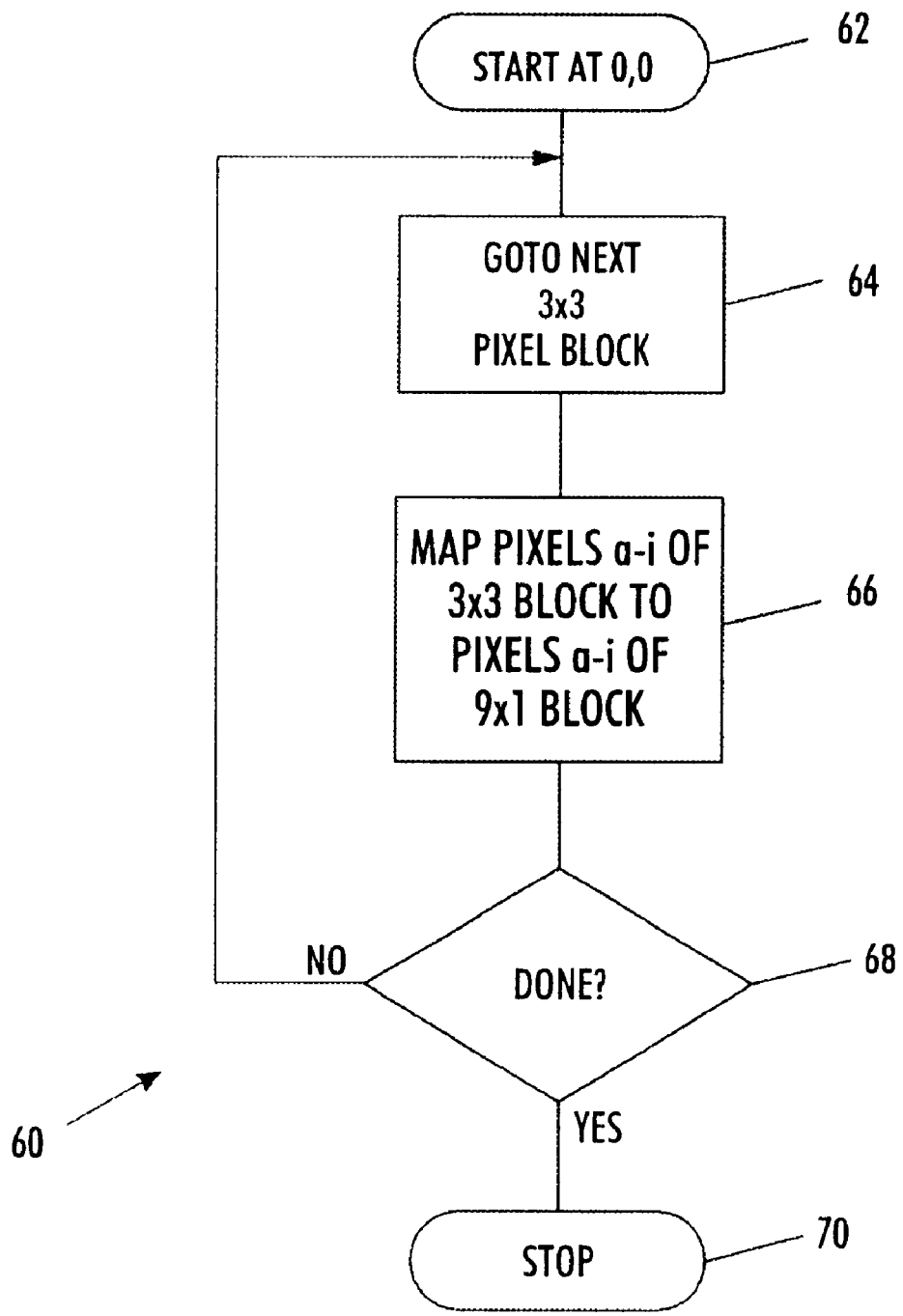
FIG. 5 is a flow chart illustrating the conversion process executed in the graphical representation of FIG. 4; and, FIG. 6 shows a flow chart illustrating the use of the subject reversible resolution conversion for inverse processing a high addressable halftone threshold array, rendering an image, then forward processing the image to produce a high addressable image suitable for marking on an IOT.

FIG. 5 illustrates a simplified flowchart form of the mapping method 60 shown graphically in FIG. 4. Turning now to that figure, the method 60 begins at step 62 at an origin or 0,0 datum "location" in the binary input image 50. Next, at step 64, a first 3×3 pixel block in the input image data 50 is located. At step 66, each of the nine pixels 54a–54i of the first 3×3 pixel block 54 is mapped directly to corresponding pixels 56a–56i in the 9×1 pixel block 56. Next, at step 68, it is determined whether each of the 3×3 pixel blocks in the input image has been converted to a corresponding 9×1 high addressability image block. If not, the sequence 64, 66 is repeated until each of the 3×3 pixel blocks in the input image is converted to a 9×1 pixel block in the high addressability image according to the scheme shown in FIG. 4.

Figure 6:
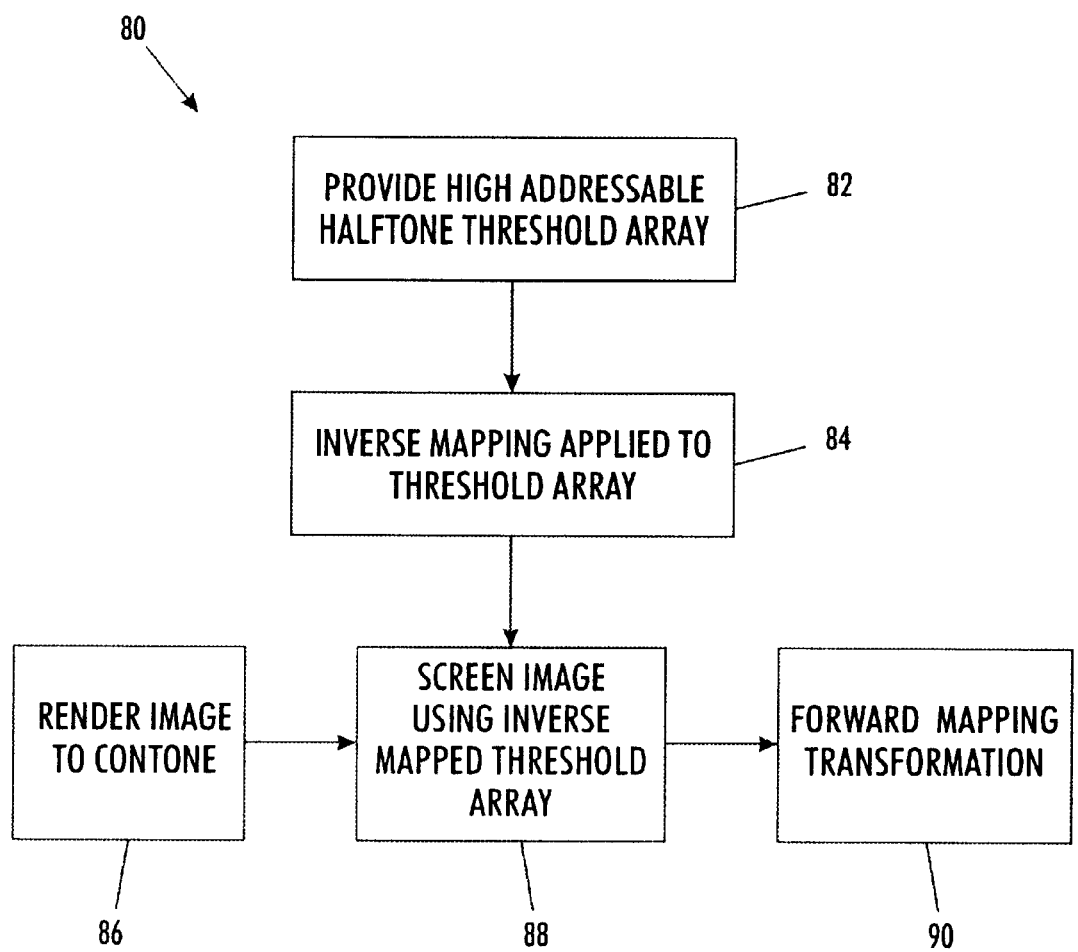

Turning lastly to FIG. 6, a preferred method 80 for simulating high resolution halftone printing using high addressability in accordance with the present invention will be described. First, however, it is to be appreciated that the mapping of high resolution bits from the input image data to half bit high addressable bits in the output image data is completely reversible. This is extremely advantageous during halftoning. To that end, as shown in FIG. 6, at step 82, a high addressable halftone threshold array is provided. Preferably, in accordance with the preferred embodiment of the invention, the high addressable halftone threshold array has a resolution of 2400×600. Next, at step 84, an inverse mapping transformation is executed to map preselected portions of the high addressable halftone threshold array to corresponding preselected 2×2 portions of a balanced halftone threshold array, preferably having a resolution of 1200× 1200 spi. The inverse resolution conversion of the high addressable threshold array executed in step 84 generates a preprocessed halftone threshold array 13 (FIG. 1) for real time high resolution halftoning of image or video data 11 (FIG. 1) by a halftoner 12 (FIG. 1).

A preferred algorithm for inverse mapping 84 the high addressable halftone threshold array is described below in pseudo code;

for each input row of the second image (in order)
{
for each column of input row
if the column # mod 4 is 0 or 3 then print the pixel
go to next output row
for each column of input row
if the column # mod 4 is 1 or 2 then print the pixel
go to next output row
}

At step 86, a continuous tone image is rendered. The rendered continuous tone image is screened at step 88 by applying the preprocessed halftone threshold array 13 (FIG. 1) generated at step 86 to the high resolution (e.g. 1200× 1200) image rendered at step 84 to generate a screened image.

Lastly, at step 90, the image rendered at a balanced resolution, i.e., 1200×1200 is converted to a high addressable binary image having a high addressability value. The conversion of the rendered image at step 90 is preferably formed in accordance with the method described above in connection with FIGS. 2 and 3.

Although the present invention has been described in detail above, various modifications can be implemented without departing from the spirit of the present invention. For example, the preferred embodiment has been described with respect to a printing system. However, the resolution conversion method is readily implemented in a display system. Moreover, the conversion process of the present invention can be readily implemented on an ASIC, thereby enabling the placement of the process in a scanner, electronic sub-system, printer, or display device.

Also, the present invention has been described with respect to initial resolutions of 1200×1200×b, and 1800× 1800×b and a final resolution of 2400×600 and 5400×600. However, it is contemplated by the present invention to take any fast-scan and slow-scan resolution image and map it to a higher fast scan resolution and a lower slow scan resolution for remapping the high resolution bits to half bit high addressable bits.

Lastly, the present invention has been described with respect to a monochrome or black/white environment. However, the concepts of the present invention are readily available to a color environment. Namely, the mapping conversion process of the present invention can be applied to each color space value representing the color pixel.

While the invention has been described with reference to various embodiments disclosed above, it is not confined to the details set forth above, but is intended to cover such modifications or changes as may come within the scope of the attached claims.

What is claimed is:

1. A method for simulating high resolution printing by converting high resolution bits of a binary image to sub-pixel high addressable bits, the method comprising the steps of:
   receiving a first image having a first fast-scan resolution and a first slow-scan resolution; and,
   converting the first image to a second image having a second fast-scan resolution and a second slow-scan resolution, the second fast-scan resolution being greater than said first fast-scan resolution and the second slow-scan resolution being less than said first slow-scan resolution.

2. The method according to claim 1 wherein the step of converting includes mapping a plurality of portions of said first image to a corresponding plurality of portions of said second image.

3. The method according to claim 2 wherein the step of mapping includes mapping said plurality of portions of said first image to said corresponding plurality of portions of said second image in a manner to establish a one-to-one correspondence between first image bits in each of said plurality of portions of said first image with second image bits in each of said plurality of portions of said second image.

4. The method according to claim 3 wherein the step of mapping is reversible to map said plurality of portions of said second image to said plurality of portions of said first image without loss of image information of said first or second images.

5. The method according to claim 3 wherein the step of mapping includes:
   mapping a plurality of 2×2 pixel block portions of said first image to a corresponding plurality of 4×1 pixel block portions of said second image.

6. The method according to claim 5 wherein the step of mapping includes:
   mapping a plurality of 2×2 600 spi pixel block portions of said first image to a corresponding plurality of 4×1 2400×600 spi pixel block portions of said second image.

7. The method according to claim 5 further including the step of inverse mapping said plurality of portions of said second image to said corresponding plurality of portions of said first image by mapping said plurality of 4×1 pixel block portions of said second image to said plurality of 2×2 pixel block portions of said first image.

8. The method according to claim 7 further including the step of inverse resolution conversion of a halftone array to generate a preprocessed halftone threshold array according to:

for each input row of the second image (in order)
{
for each column of input row
if the column # mod 4 is 0 or 3 then print the pixel
go to next output row
for each column of input row
if the column # mod 4 is 1 or 2 then print
the pixel
go to next output row
}.

9. The method according to claim 8 further including the step of applying said preprocessed halftone threshold array in a halftoner to render contone image data as high resolution halftoned image data.

10. The method according to claim 9 further including the step of forward resolution conversion of said high resolution halftoned image data to generate high addressability halftoned image data.

11. The method according to claim 3 wherein the step of mapping includes:
   mapping a plurality of 3×3 800 spi pixel block portions of said first image to a corresponding plurality of 9×1 5400×600 spi pixel block portions of said second image.

12. The method according to claim 2 wherein the mapping step includes mapping, for each of said plurality of portions of said first image, a group of pixels in a first physical area of said first image to a group of pixels in a second physical area of said second image, the first and second physical areas having the same size relative to the first and second images, respectively.

13. A method of generating a high addressable halftone image from a high resolution binary image for marking on an image output terminal, the method comprising the steps of:
   providing a high addressable halftone threshold array having a first high addressability value;
   converting the high addressable halftone threshold array to a balanced halftone threshold array having a first resolution in a fast-scan direction and in a slow-scan direction;
   screening a contone image by applying the balanced halftone threshold array to the contone image to generate a screened image;
   rendering the screened image at a balanced resolution to generate a rendered image; and,
   using a forward resolution conversion circuit, converting the rendered image to a high addressable binary image having said first high addressability value.

14. A system for generating a high addressable halftone image from a high resolution binary image for marking on an image output terminal, the system comprising:
   a memory storing a preprocessed halftone threshold array having a first resolution in a fast-scan direction and in a slow-scan direction;
   a halftoner for screening contone video data by applying said preprocessed halftone threshold array to generate a screened image;
   rendering means for rendering the screened image to generate a rendered image; and,
   a forward resolution conversion circuit for converting the rendered image to a high addressable binary image.

15. The system according to claim 14 wherein the forward resolution conversion circuit includes means for mapping a plurality of portions of said rendered image to a corresponding plurality of portions of said high addressable binary image.

16. A system for generating a high addressable halftone image from a high resolution binary image for marking on an image output terminal, the system comprising:
   a memory storing a preprocessed halftone threshold array having a first resolution in a fast-scan direction and in a slow-scan direction;
   a halftoner for screening contone video data by applying said preprocessed halftone threshold array to generate a screened image;
   rendering means for rendering the screened image to generate a rendered image; and,
   a forward resolution conversion circuit for converting the rendered image to a high addressable binary image, said forward resolution conversion circuit including means for mapping a plurality of portions of said rendered image to a corresponding plurality of portions of said high addressable binary image and means for mapping said plurality of portions of said rendered image to said corresponding plurality of portions of said high addressable binary image in a manner to establish a one-to-one correspondence between first image bits in each of said plurality of portions of said rendered image with second image bits in each of said plurality of portions of said high addressable binary image.

17. The system according to claim 16 wherein said forward resolution conversion circuit includes means for mapping a plurality of 2×2 pixel block portions of said rendered image to a corresponding plurality of 4×1 pixel block portions of said high addressable binary image.

18. The system according to claim 17 further comprising an inverse resolution conversion circuit for inverse mapping said plurality of portions of said high addressable binary image to said corresponding plurality of portions of said rendered image by mapping said plurality of 4×1 pixel block portions of said high addressable binary image to said plurality of 2×2 pixel block portions of said rendered image.

* * * * *